United States Patent [19]

Oguri

[11] Patent Number: 4,889,080
[45] Date of Patent: Dec. 26, 1989

[54] CYLINDER HEAD FOR AN INTERNAL COMBUSTION ENGINE

[75] Inventor: Hideo Oguri, Oyama, Japan

[73] Assignee: Kabushiki Kaisha Komatsu Seisakusho, Tokyo, Japan

[21] Appl. No.: 198,547

[22] Filed: May 24, 1988

[30] Foreign Application Priority Data

May 26, 1987 [JP] Japan .................................. 62-78128

[51] Int. Cl.⁴ .............................................. F02F 1/36
[52] U.S. Cl. .......................... 123/41.82 R; 123/41.31; 123/41.79
[58] Field of Search ................. 123/41.72, 41.79, 41.8, 123/41.82, 41.31

[56] References Cited

U.S. PATENT DOCUMENTS

| | | | |
|---|---|---|---|
| 1,840,922 | 1/1932 | Steiner | 123/41.82 |
| 1,904,459 | 4/1933 | Hefti | 123/41.8 |
| 3,769,948 | 11/1973 | Feichtinger et al. | 123/41.82 R |

FOREIGN PATENT DOCUMENTS 55-132339 3/1979 Japan.
55-132341 3/1979 Japan.
58-59942 4/1983 Japan.

Primary Examiner—Noah P. Kamen
Attorney, Agent, or Firm—Diller, Frank & Wight

[57] ABSTRACT

A cylinder head for an internal combustion engine includes a plurality of cooling water passages through which cooling water for cooling the cylinder head is injected. Each of the cooling water passages is so arranged that cooling water injected therethrough is caused to unidirectionally swirl around an outer wall for a fitting hole through which a fuel injection nozzle is fitted. Thus, there is no fear that stagnation of water stream due to collision of water streams flowing around the outer wall for the fuel injection fitting hole occurs or bubbles are produced. This leads to reduction of resistance against flowing of cooling water whereby a cooling efficiency of cooling water for the cylinder head can be increased.

4 Claims, 3 Drawing Sheets

CYLINDER HEAD FOR AN INTERNAL COMBUSTION ENGINE

BACKGROUND OF THE INVENTION

The present invention relates to a cylinder head for an internal combustion engine adapted to cool a fuel injection nozzle and an area located in the vicinity of suction valve seats and exhaust valve seats thereof.

In a conventional automotive water cooling system the cooling water is recirculated within a water jacket. The water absorbs heat generated by the internal combustion engine to prevent problems which might otherwise be created by thermal load. The cylinder head for such an internal combustion engine includes a fuel injection nozzle, suction valve seats and exhaust valve seats. The cylinder head is formed with a water jacket which surround the fuel injection nozzle, the suction valve seats and the exhaust valve seats and cools them by the cooling water circulating through the water jacket.

FIG. 1 is a cross sectional view of a conventional cylinder head 1 having a water jacket which includes cooling water passages. FIG. 1 particularly illustrates a 2-valve cylinder head for a diesel engine having one suction valve and one exhaust valve per cylinder.

The 2-valve cylinder head 1 is provided with a cooling nozzle director or cooling water passage 2 which serves as a means for injecting cooling water into the water jacket of the cylinder head 1. A foremost end of the cooling nozzle director or cooling water passage 2 is oriented toward a center P of a fitting hole 3 which fits or connects a fuel injection nozzle to the cylinder head 1. The cooling water injected through the foremost end of the cooling nozzle director 2 (identified by a directional arrow in the drawing) flows through an area defined between an outer wall 4 for a suction hole through which a stem of the suction valve (not shown) is inserted and an outer wall 5 for an exhaust hole through which a stem of the exhaust valve (also not shown) is inserted. Thereafter the cooling water flows toward the center P of the nozzle fitting hole 3 whereby a fuel injection nozzle therein (not shown) and an area in the vicinity of the suction and exhaust valve seats are cooled by the concentrated application of the cooling water.

FIG. 2 is a cross sectional view of another conventional cylinder head 10 which includes a water jacket with cooling water passages therein. FIG. 2 illustrates a 4-valve cylinder head which includes two suction valves and two exhaust valves per cylinder.

The 4-valve cylinder head 10 is provided with a bridge portion a located between an outer wall 11 for a suction hole and an outer wall 12 for an exhaust hole. A bridge portion b is located between the adjacent outer walls 12 and 13 for the exhaust holes. A bridge portion c located between the outer wall 13 for the exhaust hole and an outer wall 14 for a suction hole. The bridge portions a, b and c are located outside both the suction and exhaust valve seats and have respective cooling water passages 15, 16 and 17 formed therein. Foremost ends of the cooling water passages 15, 16 and 17 are oriented toward a center P of a fuel injection nozzle fitting hole 18. Cooling water injected through the cooling water passages 15, 16 and 17 (unnumbered directional arrows in the drawing) is concentrated at and cools the fuel injection nozzle and an area in the vicinity of the suction valve seats and the exhaust valve seats.

In order to meet recent requirements for running engines at higher speeds and supercharging at a higher rate, many internal combustion engines, both gasoline engines and diesel engines, are designed to have relatively large diameter suction valves and exhaust valves. Alternately, such internal combustion engines employ four valves per cylinder, namely, two suction valves and two exhaust valves per cylinder. With respect to the conventional 2-valve internal combustion engine, the suction and exhaust valves also have enlarged diameters and a distance L (FIG. 1) between the outer wall 4 for the suction port and the outer wall 5 for the exhaust port is decreased. This decrease in distance presents a sufficient amount of water injected through the cooling nozzle director 2 to flow through the space defined between the walls 4, 5 and thus prevents desirable reduced cooling. This obviously prevents the internal combustion engine from obtaining increased output.

In the case of conventional 4-valve type internal combustion engines, cooling water injected through the cooling passages 15, 16 and 17 toward the center P of the fuel injection nozzle insert hole 18 (identified by directional arrows in the drawing) collides against the outer wall 19 for the fuel injection nozzle fitting hole 18. After colliding against the outer wall 19, the cooling water bifurcates and collides against the stream of cooling water injected from the opposite side, as shown in Figure 2, and this results in cooling water stagnation. Further, as a result of the collision just mentioned, bubbles adhere to the outer wall 19 causing cooling efficiency to be reduced. Accordingly, if an increased output from the 4-valve internal combustion engine is required, thermal load is increased which leads to cylinder head cracking. Consequently, the conventional 4-valve internal combustion engine has a problem in that a highly incrased output therefrom cannot be obtained in the same manner as that of the conventional 2-valve internal combustion engine.

SUMMARY OF THE INVENTION

An object of the present invention is to provide a cylinder head for an internal combustion engine which assures high cooling efficiency.

Another object of the present invention is to provide a cylinder head for an internal combustion engine which assures that cooling efficiency is increased merely by a simple change in design without substantial modification imparted to structure of the conventional cylinder head, and the latter achieves a highly increased output from the internal combustion engine.

To accomplish the above objects, the present invention provides a cylinder head for an internal combustion engine which is so constructed that bridge portions provided between suction valve seats and exhaust valve seats are formed with a plurality of cooling water passages through which cooling water is injected. The foremost ends of the cooling water passages are oriented in tangential relationship to the outer wall of a cylindrical fuel injection nozzle fitting hole whereby cooling water injected toward the outer wall for the fuel injection nozzle fitting hole through the cooling water passages is caused to unidirectionally swirl around the outer wall for the fuel injection nozzle fitting hole.

With the above, and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
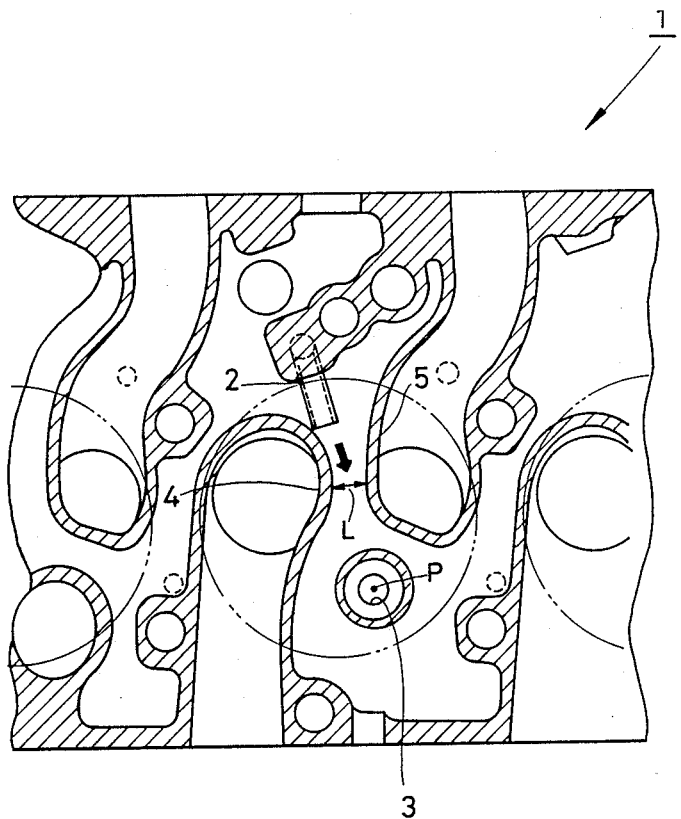
FIG. 1 is a cross sectional view of a cylinder head for a conventional 2-valve type internal combustion engine which includes two valves per cylinder.
Figure 2:
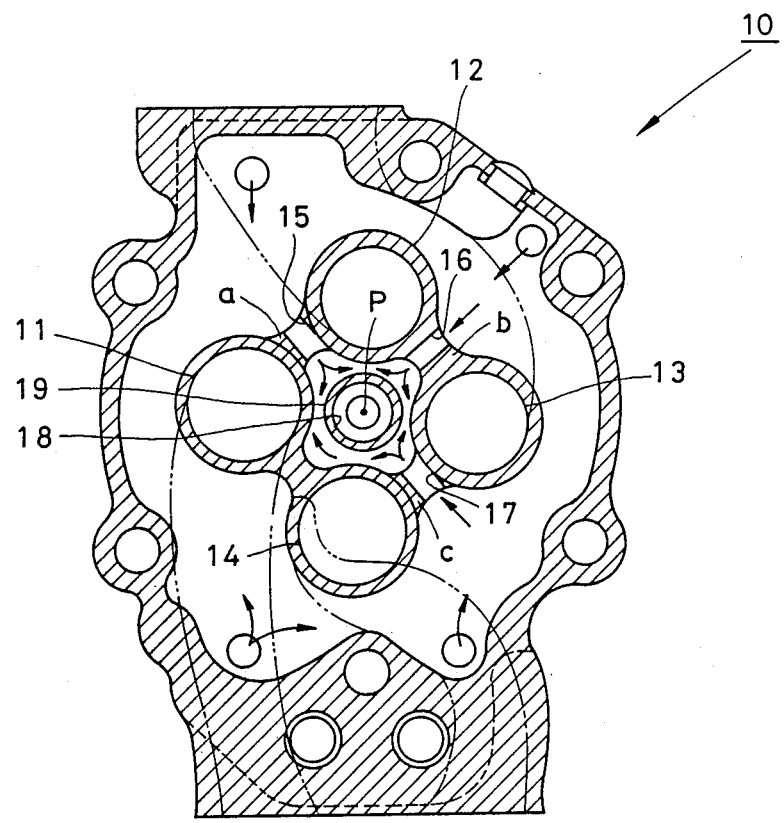
FIG. 2 is a cross sectional view of a cylinder head for a conventional 4-valve internal combustion engine which includes four valves per cylinder.
Figure 3:
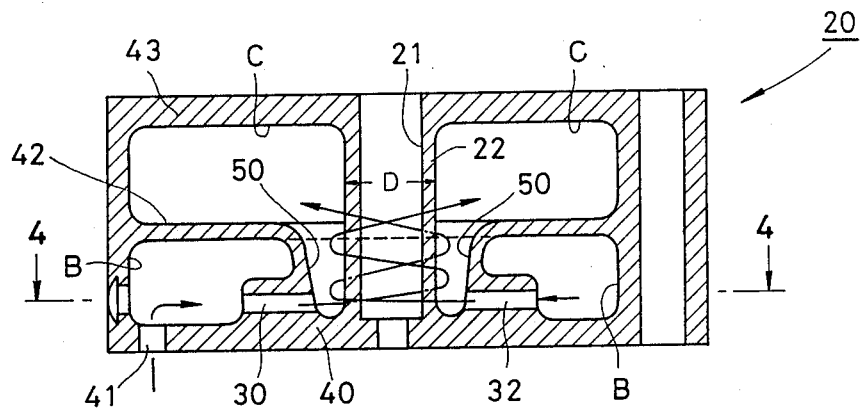
FIG. 3 is a vertical sectional view of a cylinder head for a 4-valve internal combustion engine constructed in accordance with the present invention.
Figure 4:
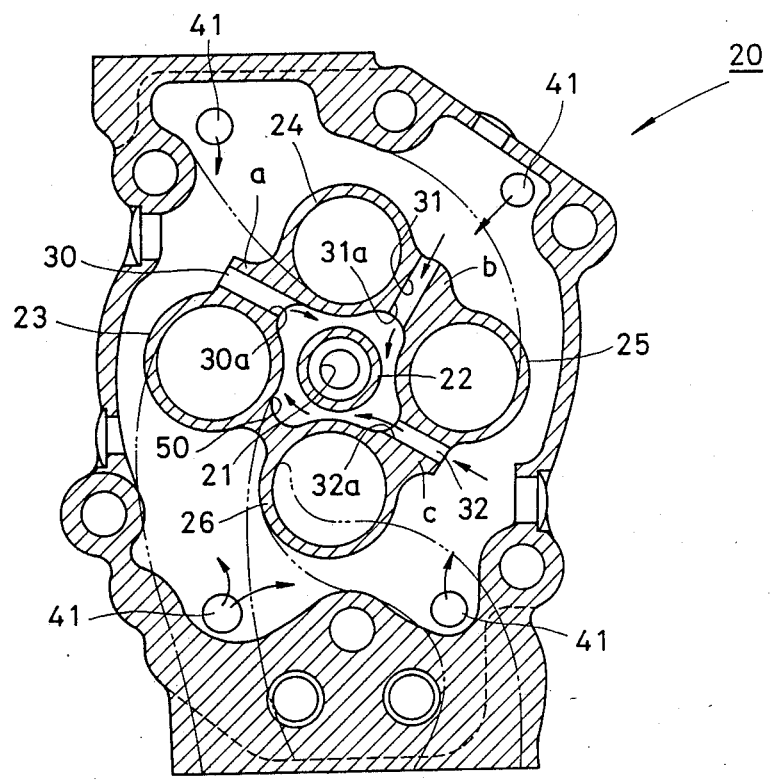
FIG. 4 is a cross sectional view of the cylinder head taken generally along line 3—3 of FIG. 3.

A cylinder head 20 and internal combustion engine constructed in accordance with this invention is illustrated in FIGS. 3 and 4 of the drawings, and illustrated therein is a 4-valve cylinder head for a diesel engine wherein the cylinder head includes two section valves and two exhaust valves per cylinder.

As is illustrated in FIG. 4, the cylinder head 20 is formed with a fuel injection nozzle insert hole 21 which has a diameter D (FIG. 3) around which is disposed an upright cylindrical outer wall 22. The cylinder head 20 includes a bridge portion a located between a suction hole outer wall 23 and an exhaust hole outer wall 24. A bridge portion b is located between the adjacent exhaust hole outer walls 24 and 25. A bridge portion c is located between the exhaust hole outer wall 25 and a suction hole outer wall 26. The bridge portions a, b and c are located outside the cylindrical wall 22 and have cooling water passages 30, 31 and 32, respectively, formed therein. Foremost ends 30a, 31a, and 32a of the respective cooling water passages 30, 31 and 32 are oriented in tangential relationship relative to the cylindrical outer wall 22. It should be noted that the tangential orientation of the foremost ends 30a, 31a, and 32a of the respective cooling water passages 30, 31 and 32 is achieved in the clockwise direction, as viewed in FIG. 4.

A water jacket 50 is formed in such a manner as to surround the outer wall 22 of the insert hole 21 through which a fuel injection nozzle is fitted.

As is best illustrated in FIG. 3, cooling water supplied from a cylinder block (not shown) is introduced through water supply holes 41 formed in a lower wall 40 of the cylinder head 20 into a lower chamber B. The lower chamber serves as a water jacket defined by the lower wall 40 and an intermediate wall 42 of the cylinder head 20.

The cooling water which has been introduced into the lower chamber B of the cylinder head 20 is intensely injected toward the cylinder outer wall 22 (having a diameter of D, as shown in FIG. 3) formed around the fuel injection nozzle insert hole 21. The introduction of the cooling water from the lower chamber B toward the cylindrical outer water 22 is through the cooling water passages 30, 31 and 32. The water passage 31 is, of course, formed in the bridge portion a between the suction hole outer wall 23 and the exhaust hole outer wall 24. The water passage 31 is formed in the bridge portion b between the adjacent outer walls 24 and 25. The water passage 32 is formed in the bridge portion c between the exhaust hole outer wall 25 and the suction hole outer wall 26. Since the passages 30, 31 and 32 and the respective foremost ends 30a, 31a and 32a are oriented tangentially relative to the cylindrical outer wall 22, the cooling water is injected through the foremost ends 30a, 31a and 32a in generally tangential direction indicated by the unnumbered headed arrows associated therewith in FIG. 4. The cooling water thus injected through the foremost ends 30a, 31a, and 32a becomes a water stream which swirls unidirectional (clockwise as viewed in FIG. 4) at a high speed toward the outer surface of the outer cylindrical wall 22 bounding the fuel injection insert hole 21 which is, of course, the interior wall of the water jacket 50. As shown in FIG. 3, the cooling water which has become a water stream swirling at a high speed around the cylindrical outer wall 22 also ascends the wall 22 until it is introduced into an upper chamber C defined by the intermediate wall 42 and an upper wall 43 of the cylinder head 20. In this manner the upper chamber C is also effectively cooled.

Though the above-mentioned embodiment has been described relative to a cylinder head 20 having four valves per cylinder, the invention is equally applicable to a cylinder head having two valves per cylinder.

The cylinder head 20 of the invention is so constructed that cooling water passages constituting a part of the water jacket are formed so as to allow cooling water injected through the cooling water passages to intensely swirl around the fuel injection insert hole 21 and the wall 22 defining the same, as is clearly apparent from FIGS. 3 and 4 of the drawings. Thus, the cooling water flows without any stagnation of the cooling water stream due to collision of the water streams or without any production of bubbles. Further, since resistance against the flowing of the cooling water through the water passages is reduced, the cylinder head 20 of the invention has an increased cooling efficiency which leads to an increased input from the internal combustion engine.

Although a preferred embodiment of the invention has been specifically illustrated and described herein, it is to be understood that minor variations may be made in the apparatus and the method without departing from the spirit and scope of the invention as defined in the appended claims.

What is claimed is:

1. A cylinder head for an internal combustion engine of a four-valve cylinder having two suction valves and two exhaust valves per cylinder, outer walls for suction holes through which said suction valves are inserted and outer walls for exhaust holes through which said exhaust valves are inserted are connected by means of bridge members, said outer walls surround an outer wall for a fitting hole through which a fuel injection nozzle is fitted, the outer walls for said suction holes and said exhaust holes and the outer wall for said fitting hole form a water jacket which surrounds the outer wall for said fitting hole, characterized in that each of at least three of said bridge members includes a machined cooling water passage, a foremost end of each machined cooling water passage is oriented tangential and directed in one rotational direction relative to the outer wall for the fitting hole whereby cooling water exiting from the cooling water passages swirls in said one rotational direction in the water jacket along the outer wall of said fitting hole.

2. The cylinder head of claim 1 wherein said internal combustion engine is a diesel engine. holes and said exhaust holes and the outer wall for said fitting hole form a water jacket which surrounds the outer wall for said fitting hole, characterized in that each of at least three of said bridge members includes a machined cooling water passage, a foremost end of each machined cooling water passage is oriented tangential and directed in one rotational direction relative to the outer wall for the fitting hole whereby cooling water exiting from the cooling water passages swirls in said one rotational direction in the water jacket along the outer wall of said fitting hole.

3. A cylinder head for an internal combustion engine of a two-valve cylinder having one suction valve and one exhaust valve per cylinder, an outer wall for a suction hole through which said suction valve is inserted and an outer wall for an exhaust hole through which said exhaust valve is inserted are connected to each other by means of bridge members, said outer walls surround an outer wall for a fitting hole through which a fuel injection nozzle is fitted, the outer walls for said suction hole and said exhaust hole and the outer wall for said fitting hole form a water jacket which surrounds the outer wall for said fitting hole, characterized in that each of at least three of said bridge members includes a machined cooling water passage, a foremost end of each machined cooling water passage is oriented tangential and directed in one rotational direction relative to the outer wall for the fitting hole whereby cooling water exiting from the cooling water passages swirls in said one rotational direction in the water jacket along the outer of said fitting hole.

4. The cylinder head of claim 3 wherein said internal combustion engine is a diesel engine.

* * * * *